United States Patent [19]

Inoue et al.

[11] Patent Number: 5,365,264
[45] Date of Patent: Nov. 15, 1994

[54] VIDEO NETWORK SYSTEM WITH COMPUTER LAN

[75] Inventors: Akino Inoue, Kawasaki; Motohiro Misawa, Sagamihara; Kazuaki Yamaguchi, Kawasaki; Etsumi Kanaya, Yokohama, all of Japan

[73] Assignee: Matsushita Electric Industrial Co., Ltd., Osaka, Japan

[21] Appl. No.: 800,293

[22] Filed: Nov. 29, 1991

[30] Foreign Application Priority Data

Nov. 29, 1990 [JP] Japan ............................ 2-334011

[51] Int. Cl.⁵ .......................... H04B 3/50; H04H 1/02
[52] U.S. Cl. ........................ 348/10; 348/12; 455/5.1; 455/6.1
[58] Field of Search ............ 455/6.1, 6.2, 5.1, 3.1, 455/4.1, 4.2; 358/86; 370/85.1

[56] References Cited

U.S. PATENT DOCUMENTS

| | | |
|---|---|---|
| 3,943,283 | 3/1976 | Caragnano et al. |
| 4,533,948 | 8/1985 | McNamara et al. ............ 455/5.1 |
| 4,725,886 | 2/1988 | Galumbeck et al. ........... 358/147 |
| 4,885,747 | 12/1989 | Foglia ............................ 455/6.2 |
| 4,901,367 | 2/1990 | Nicholson ..................... 455/6.2 |
| 4,982,430 | 1/1991 | Freeza et al. .................. 455/5.1 |
| 5,130,793 | 7/1992 | Bordry et al. .................. 455/6.1 |

FOREIGN PATENT DOCUMENTS

| | | |
|---|---|---|
| 2315203 | 1/1977 | France. |
| 60-152153 | 8/1985 | Japan. |
| 61-287390 | 12/1986 | Japan. |

*Primary Examiner*—Reinhard J. Eisenzopf
*Assistant Examiner*—Chi Pham
*Attorney, Agent, or Firm*—Lowe, Price, LeBlanc & Becker

[57] ABSTRACT

A bi-directional video signal transmission system is equipped with transmission lines having coupled upsteam and downstream segments. With the entire band of a RF signal being taken as a modulation frequency band, an image signal modulated to a frequency band and RF-multiplexed in the upstream segment is introduced into the downstream segment at the modulated frequency and is then branched to demodulate the same frequency band, thereby obtain one video signal transmission channel. In response to a request by a subscriber, a channel management section assigns and releases the transmission channels and further outputs a control command whereby a transceiver control section performs switching-control of the transmission frequencies to transceiver units.

9 Claims, 7 Drawing Sheets

VIDEO NETWORK SYSTEM WITH COMPUTER LAN

BACKGROUND OF THE INVENTION

The present invention relates to a system for transmitting video signals.

As one of bi-directional video signal transmission systems is known a split type bi-directional CATV system which is equipped with coaxial cables having a star network topology and which has fixed frequency range for transmitting and reaceiving each. The video signal is modulated to the frequency in the fixed range for transmitting and multiplexing to RF upstream, and it is block-converted to the fixed range for receiving at the center and multiplexed to RF downstream. Thus, the split type bi-directional CATV system requires two fixed channels for each video source. In a typical arrangement for additional use as CATV, the number of the channels for transmitting video signals becomes on the order of 3 because of sufficiently ensuring the CATV channels. There are problems which arise with such an arrangement, however, in that, a channel allocated for one video source cannot be used for other video source, that is, a channel for transmitting video signal cannot be shared by plural video sources. Even if taking the high-split system, the number of effective video sources is half the number of channels in RF signal band, so it implies that the RF signal band cannot be utilized effectively. In addition, difficulty is encountered to prevent the wire tapping by a third party because it is easy to retrieve video signals by setting the channel of the tuner. This can provide a problem in security in one-to-one image communication. Moreover, the provision cost increases because of using a bi-directional amplifier as the repeating amplifier.

SUMMARY OF THE INVENTION

It is therefore an object of the present invention to provide a low-cost bi-directional video signal transmission system which is capable of effectively utilizing the transmission channels and implementing security countermeasures by software.

A bi-directional video signal transmission system is equipped with linked transmission cables for upstream and downstream communication. A baseband video signal modulated to a certain frequency and Rf-multiplexed to the upstream branch. Then the RF signal is introduced to the downstream, branch and demodulated to base band, thereby a video signal can be transmitted. In response to a request by a subscriber, a channel management section assigns transmission channels and outputs control commands to the controller of each transceiver unit to switch the modulating and demodulating frequencies.

That is, in response to a request of a video signal transmission to the channel management section by a subscriber, the channel management section searches free channels and assigns them as transmission channels, and then informs the modulators linked to the upstream branch to modulate the baseband video signal to the assigned frequency, and cause the modulators linked to the downstream branch to demodulate the RF signal to assigned frequency. By assigning the channel at every request, it is possible to realize video signal transmission which effectively utilizes the signal frequency range.

According to the present invention, there is provided a bi-directional video signal transmission system comprising: transmission line means stretched to have upstream and downstream portions for transmitting a RF signal on which an analog image signal is frequency-multiplexed; one-way amplifier means inserted into the transmission line means for amplifying the RF signal; modulating means for modulating a base-band image signal into a signal having a variable carrier frequency; dividing means inserted into the downstream segment in the transmission line means for picking up an image signal having a variable carrier frequency from the RF signal; mixing means inserted into the upstream segment in the transmission line means for mixing the modulated signals to the RF signal; demodulating means for demodulating the image signal picked up by the dividing means into the base-band image signal; image signal input means for supplying the base-band image signal to the modulating means; image display means for outputting the base-band image signal from the demodulating means; transmission request means for generating a request for a video signal transmission, channel management means for receiving the request from the transmission request means and assigning an available transmission channel at every request, and control means for controlling switching operations of modulation and demodulation in the modulating and demodulating means in accordance with the transmission signal assigned by the channel management means.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
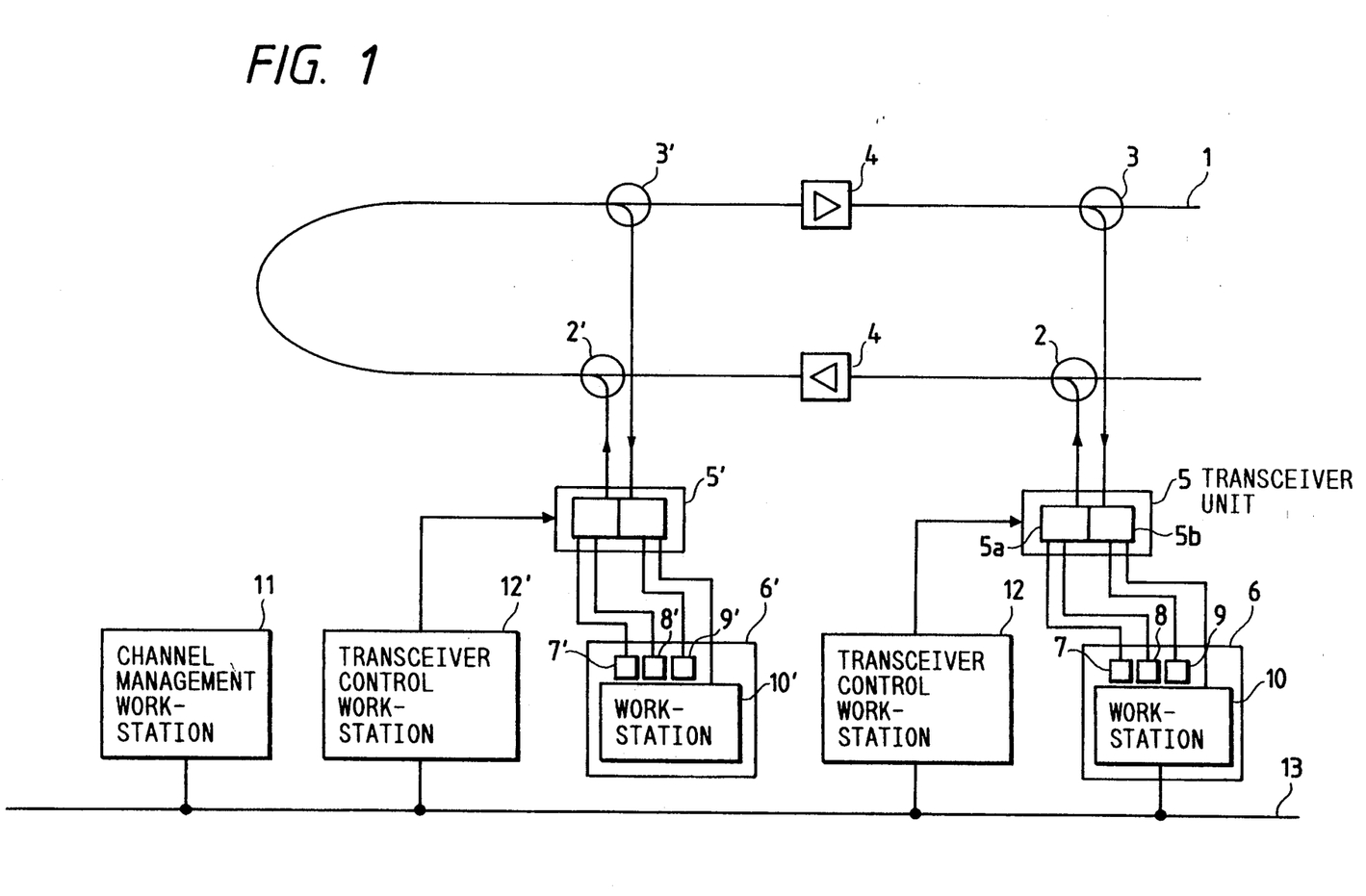
FIG. 1 is a block diagram showing an arrangement of a bi-directional video signal transmission system according to a first embodiment of the present invention.
Figure 2:
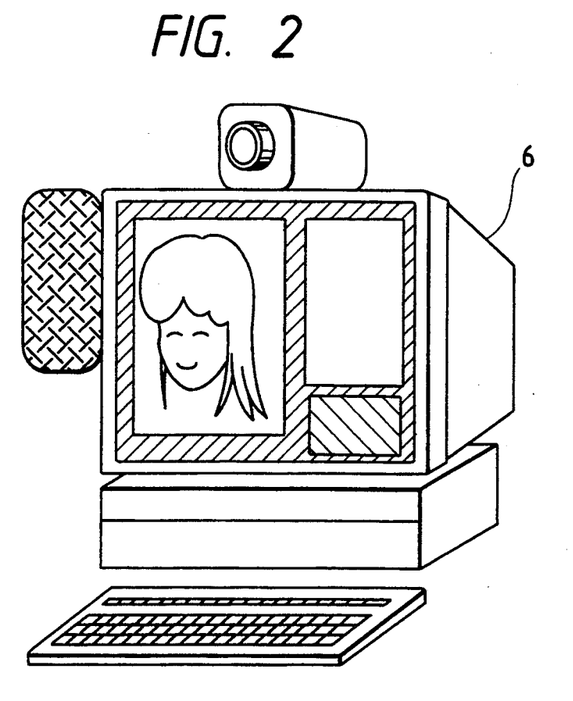
FIG. 2 is an illustration of an image input/output terminal to be used in the bi-directional video signal transmission system of the first embodiment.

Referring now to FIG. 1, there is schematically illustrated a bi-directional video signal transmission system according to a first embodiment of the present invention. This embodiment system is arranged to be capable of displaying video with a video board being provided as a video display means in a workstation and also used as a transmission request means. In FIG. 1, a coaxial cable 1 is stretched to be bent at an intermediate point as if there are two lines upstream and downstream when viewed locally. A mixing device 2 for signal mixing is inserted into the upstream segment and a dividing device 3 for signal dividing is inserted into the downstream segment of the cable 1. Further, for compensating for the attenuation of the electric signal, one-way repeating amplifiers 4 are inserted into the network. RF signal on the coaxial cable 1 has a capacity for 60 channels each corresponding to the video signal transmission channel of the usual CATV or the like. The branch lines from the mixing and dividing devices 2 and 3 are coupled through a transceiver unit 5 to a video input and output terminal 6. FIG. 2 schematically shows the image input and output terminal 6. To a modulator 5a of the tranceiver unit 5 there are inputted an image signal from a video camera 7 and an audio signal from a microphone 8. Further, an image signal from a demodulator 5b is inputted to a workstation 10 which is arranged to be video-displayable and an audio signal therefrom is inputted to a speaker system 9. The video-displayable workstation 10 also acts as a transmission request means and is coupled through a computer LAN 13 to a channel control workstation 11 and further to a transceiver control workstation 12 so as to be communicable with each other. The transceiver control workstation 12 is coupled through a cable such as RS232C to the tranceiver unit 5 to supply modulation and demodulation control command thereto.

When the user of the workstation 10 wishes to perform the bi-directional image communication with the user of a workstation 10', the workstation 10 requests the channel control workstation 11 in terms of the connection thereto. The channel control workstation 11 assigns two free channels and sends the transmission channel information to the transceiver control workstations 12 and 12' for controlling the transceiver units 5 and 5' coupled to the workstations 10 and 10' respectively. The transceiver control workstations 12 and 12' supply control commands to the tranceiver units 5 and 5' to switch the transmission frequencies so that the channel to be transmitted from the workstation 10 is received by the workstation 10' and the channel to be transmitted from the workstation 10' is received by the workstation 10. Thus, the bi-directional image communication can be realized between the user of the workstation 10 and the user of the workstation 10'. Since in such a structure the channel is arranged to be assigned at every transmission request, the number of the user terminals corresponding to about 10 times the channel number can generally be connected to the system. According to this embodiment, when the number of the channels is 60, it is possible to join approximately 600 terminals to this system. Further, since in addition to the above-described image communication the data communication can also be realized on the computer LAN 13, it is possible to realize the private multimedia communication environment.

Figure 3:
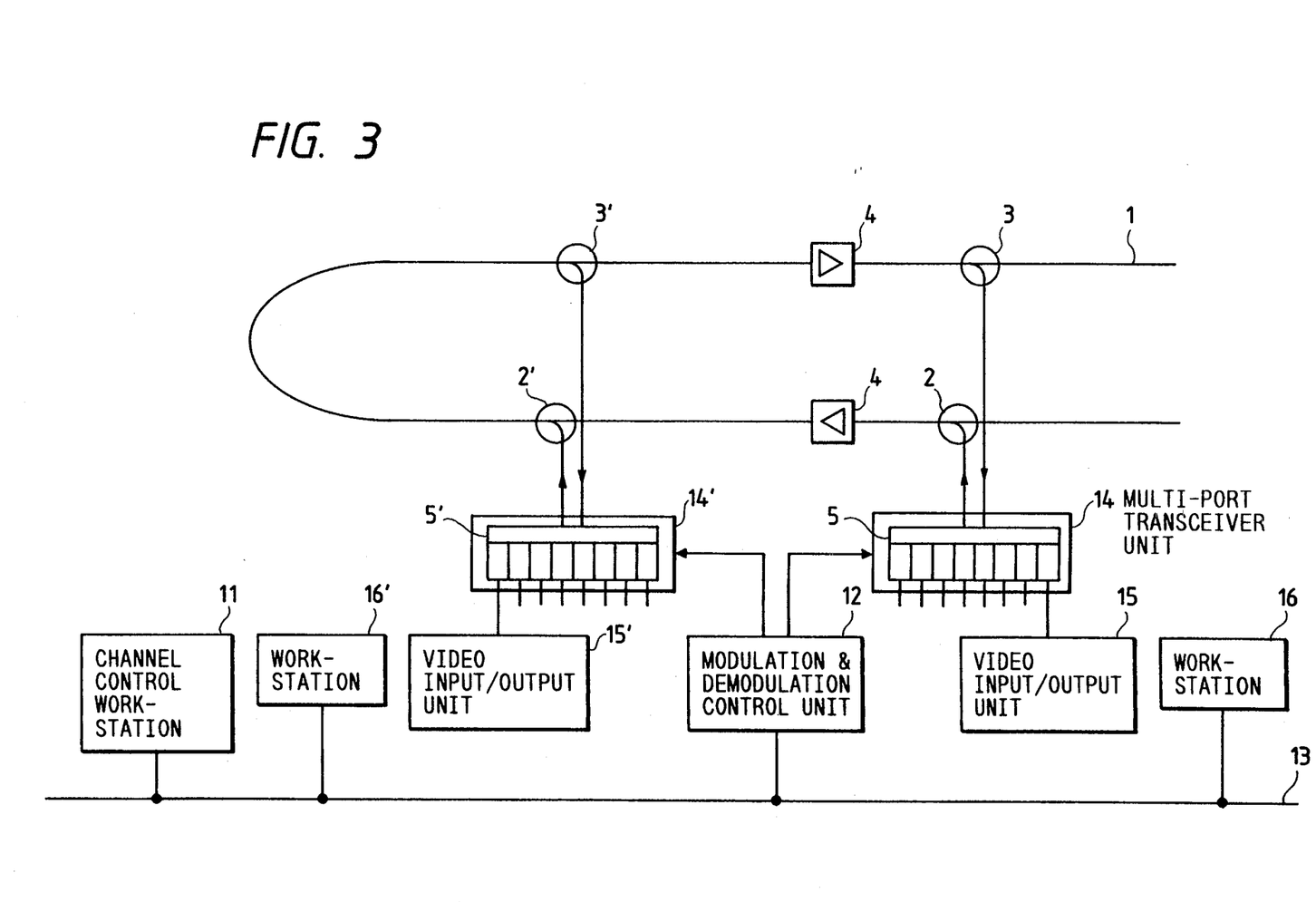
FIG. 3 is a block diagram showing an arrangement of a bi-directional video signal transmission system according to a second embodiment of this invention.
Figure 4:
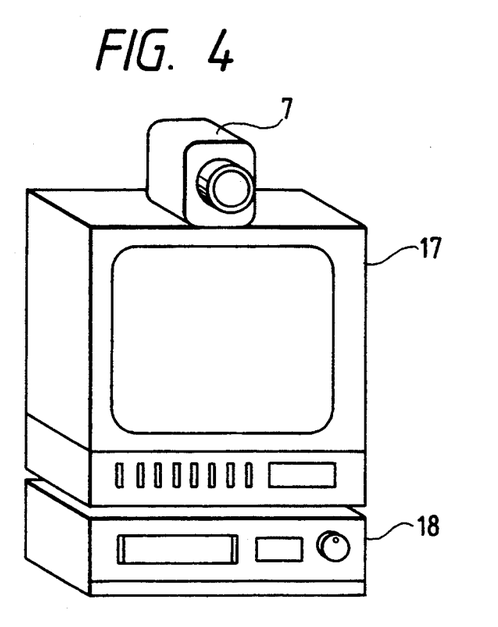
FIG. 4 is an illustration of an image input/output terminal to be used in the bi-directional video signal transmission system according to the second embodiment.

Secondly, a description will be made hereinbelow with reference to FIG. 3 in terms of an arrangement of a bi-directional video signal transmission system according to a second embodiment of this invention where parts corresponding to those in FIG. 1 are marked with the same numerals. In this embodiment, a multi-port transceiver unit including transceiver devices corresponding to 8 terminals is used, a television monitor is used as the image display means, and a workstation is used as the transmission request means. In FIG. 3, the branch lines from mixing and dividing devices 2 and 3 are respectively connected to a multi-port transceiver unit 14 in which the distribution and combination of the RF signal are effected to 8 transceiver units 5. FIG. 4 shows an image input/output unit 15 to be connected to each of the transceiver units 5. The image input/output unit 15 is composed of input means for the NTSC signal and audio signal. Although in the above-described first embodiment the video-displayable workstation and the speaker are used, this embodiment uses a television monitor 17 whose cost is relatively low. Further, a video camera 7 and a VCR 18 can also be used as the image input means. In connection to this image input/output unit 15, a workstation 16 is disposed which makes the transmission request to a channel control workstation 11. As well as in the above-described first embodiment, the workstation 16 is coupled through a computer LAN 13 to the channel control workstation and a transceiver control workstation 12. When effecting the bi-directional image communication between the image input/output units 15 and 15', the transmission request is generated from the workstation 16 to the channel control workstation 11, thereby obtaining the connection therebetween as in the first embodiment. Since in this embodiment one branch device is used for 8 transceiver units, in the case of joining the same number of transceiver units in one transmission line, the number of branch devices can be reduced as compared with the first embodiment so as to suppress noises and attenuation of signal.

Figure 5:
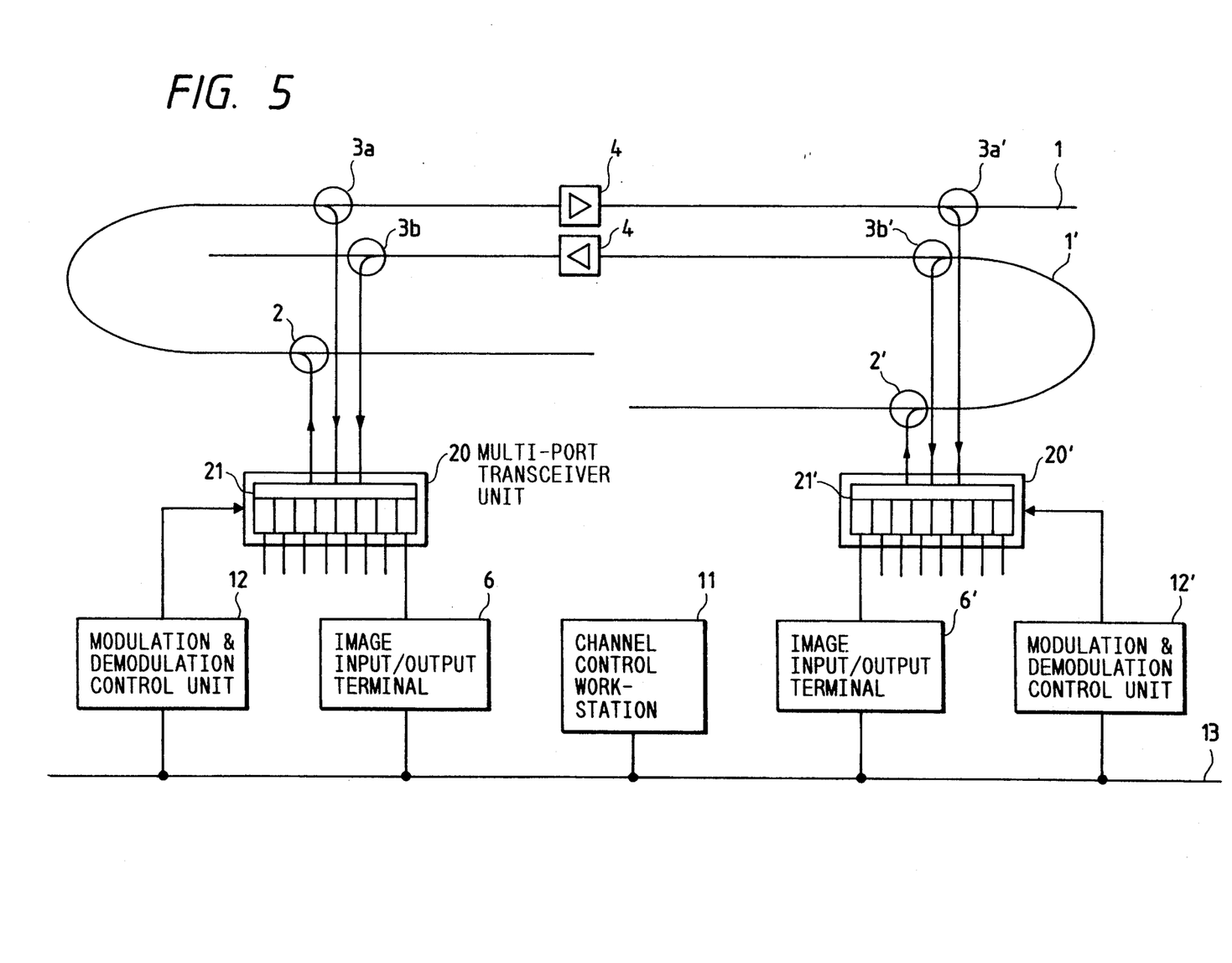
FIG. 5 is a block diagram showing a bi-directional video signal transmission system according to a third embodiment of this invention.

FIG. 5 is a block diagram showing an arrangement of a bi-directional video signal transmission system according to a third embodiment of this invention. This embodiment comprises two bi-directional video signal transmission systems according to the above-described second embodiment and uses multi-port transceiver units each having a selector function. In FIG. 5, a first coaxial cable 1 is arranged to be parallel to a second coaxial cable 1', and a branch line from a dividing device 3b for distribution of a RF signal which is inserted into the second coaxial cable 1' is connected to a multi-port tranceiver unit 20 having a selector function and a branch line from from a RF-distribution dividing device 3a inserted into the first coaxial cable 1 is also connected to the same multi-port transceiver unit 20. The multi-port transceiver unit 20 is composed of a transceiver unit 21 having therein a switcher for effecting the switching operation between two inputs. The switching between two input systems is enabled by a control command from a transceiver control workstation 12. When an image input/output terminal 6 for transmitting an image to the first coaxial cable 1 establishes the bi-directional image communication with an image input/output terminal 6' for transmitting an image to a second coaxial cable 1', the image input/output terminal 6 makes the transmission request to a channel control workstation 11. The channel control workstation 11 prepares one channel on the first coaxial cable 1 and one channel on the second coaxial cable 1', and then supplies information of the modulating channel and the demodulating transmission line and channel to the transceiver control workstations 12 and 12' for controlling the multi-port tranceiver units 20 and 20' with selector functions, respectively. This arrangement can realize the bi-directional image communication between the image input/output terminals which transmit images to different transmission lines. Further, it is possible to further increase the number of the terminals to be joined with the system That is, about 1200 terminals can be accommodated in the case of a system specification similar to that of the above-described first embodiment. Although in this embodiment two transmission lines are used, it is possible to increase the number of the transmission lines by increasing the number of inputs of the switcher.

Figure 6:
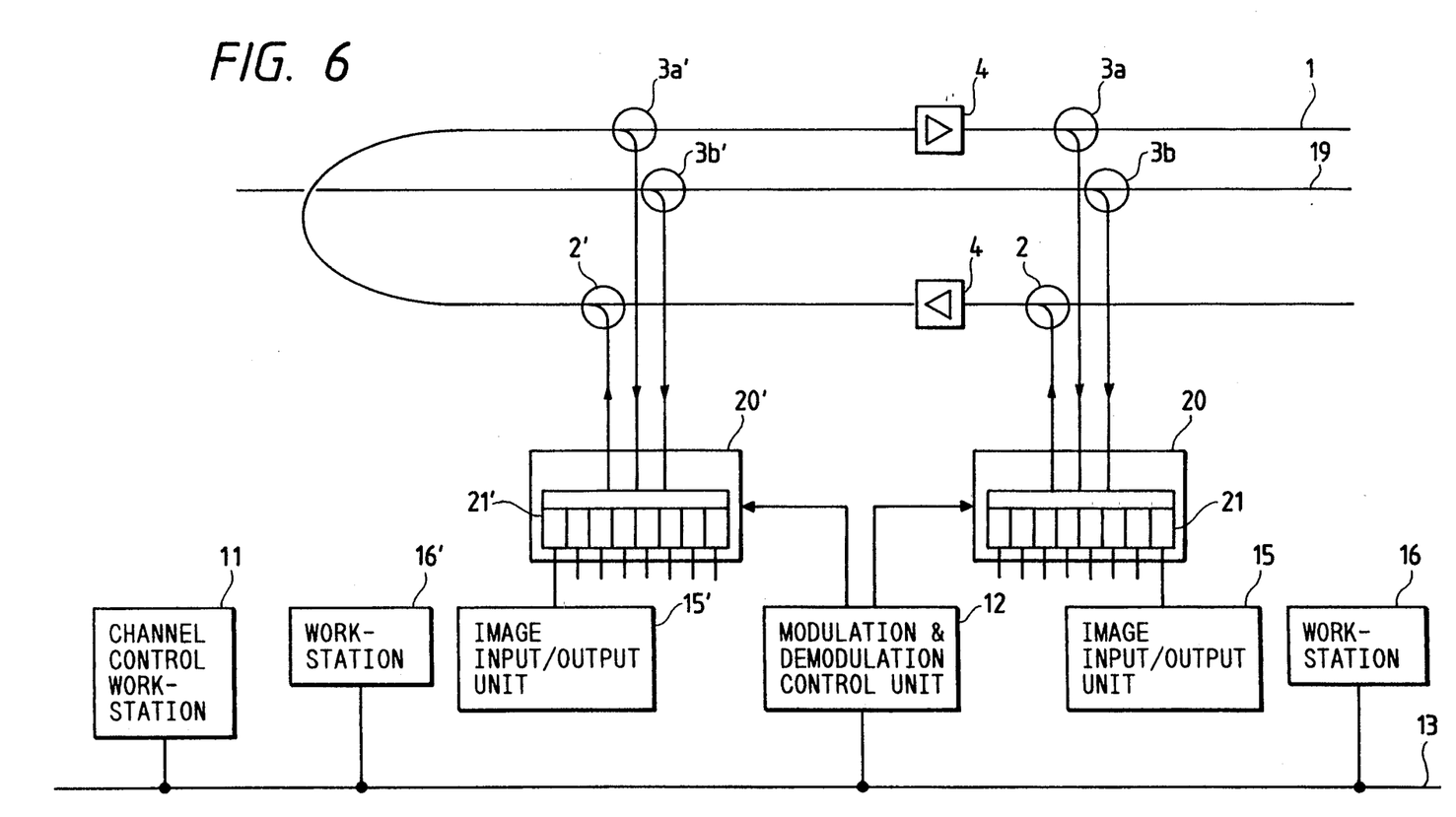
FIG. 6 is a block diagram showing a bi-directional video signal transmission system according to a fourth embodiment of this invention.

FIG. 6 is a block diagram showing an arrangement of a bi-directional video signal transmission system according to a fourth embodiment of this invention. In this embodiment, an audio system of CATV is arranged in parallel to a bi-directional video signal transmission system according to the above-described second embodiment and a multi-port tranceiver unit with a selector function is used. In FIG. 6, a CATV cable 19 is stretched to be in parallel to a coaxial cable 1 (corresponding to the coaxial cable 1 in the second embodiment). A branch line from a dividing device 3b inserted into the CATV cable 19, together with a branch line from a dividing device 3a for RF distribution in the coaxial cable 1, is coupled to a multi-port tranceiver unit 20 having a selector function. When receiving the CATV boardcast by an image input/output unit 15, a workstation 16 makes a request in terms of reception of the channel to a channel control workstation 11, whereby the image input system and the channel are respectively switched by a control command as in the case of the bi-directional image communication. With this arrangement, an image output unit of the image input/output unit 15 can receive signals from two video signal transmission systems.

Figure 7:
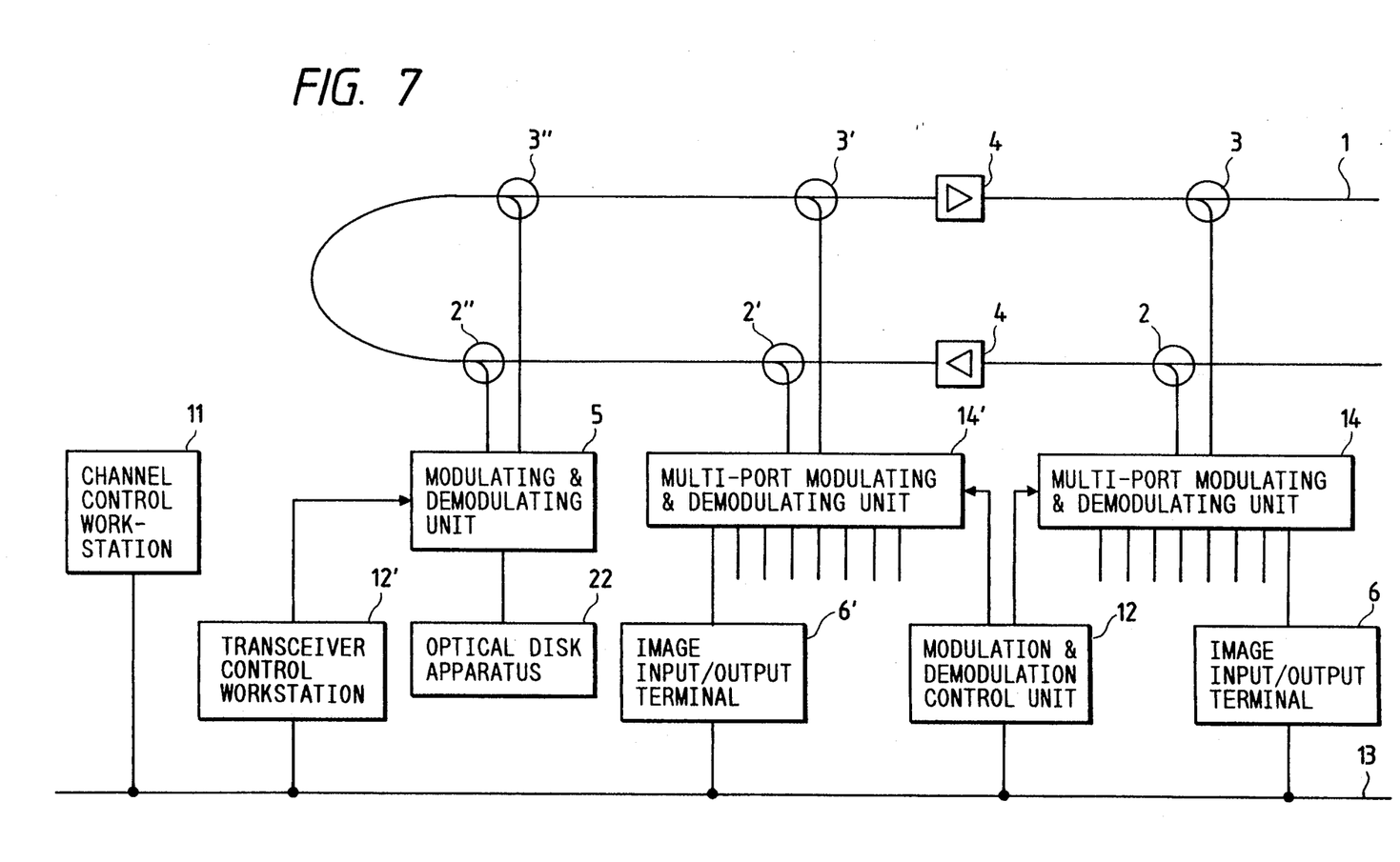
FIG. 7 is a block diagram showing a bi-directional video signal transmission system according to a fifth embodiment of this invention.

Further, a description will be made hereinbelow with reference to FIG. 7 in terms of an arrangement of a fifth embodiment of the present invention. This embodiment is arranged such that a writable optical disk apparatus acting as an image file server is connected into a bi-directional video signal transmission system. In FIG. 7, a writable optical disk apparatus 22 is connected to a tranceiver unit 5 for input and output of image signals therebetween. When performing the recording/retrieving of the video file in the vide file server by the user of an image input/output terminal 6, the recording/retrieving request of an image file is made by a workstation in the image input/output terminal 6 to a channel control workstation 11. The channel control workstation 11 makes the connection between the image input/output terminal 6 and the optical disk apparatus 22 and transmits a control command for the recording/retrieving operation of the optical disk apparatus 22. Thus, the recording/retrieving of an image file can be realized.

Figure 8:
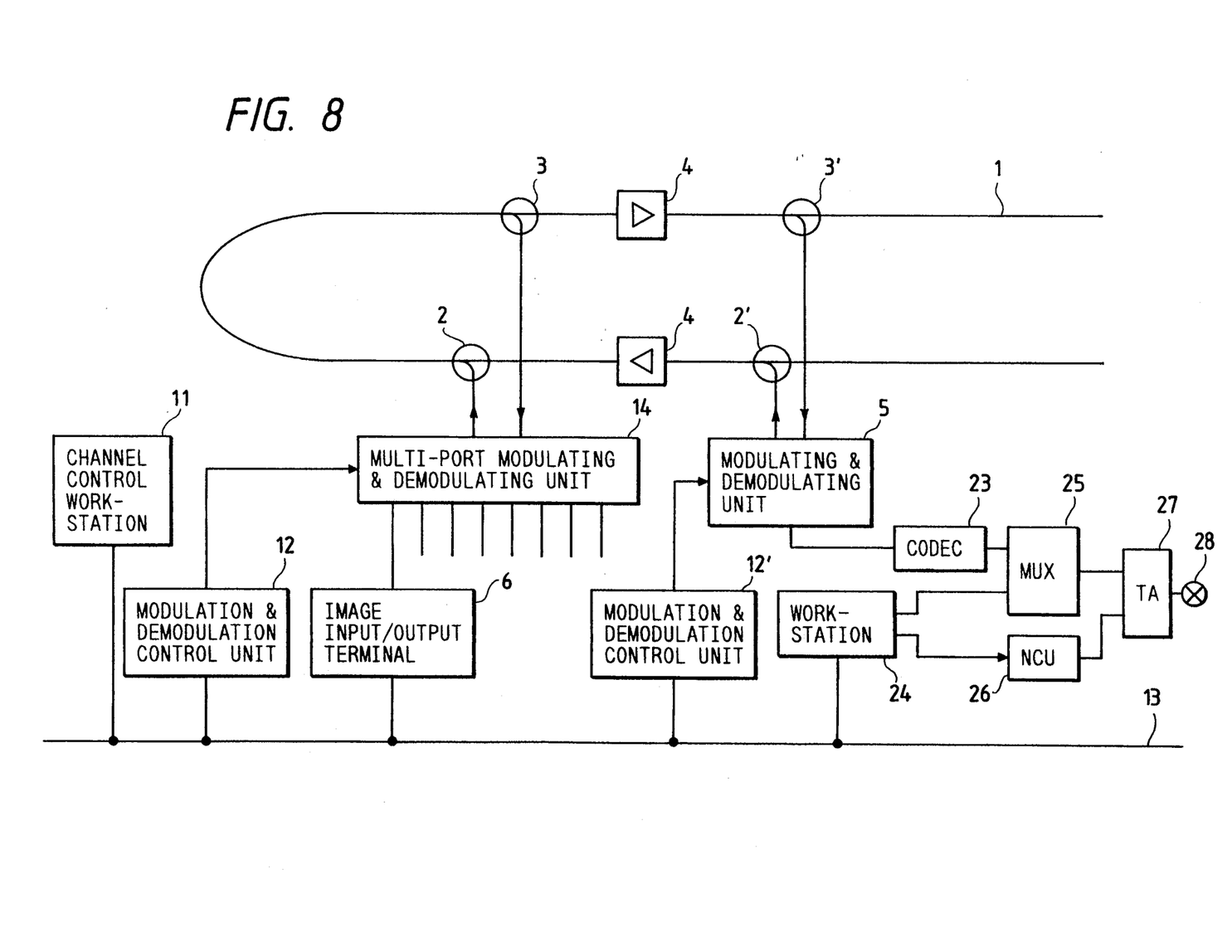
FIG. 8 is a block diagram illustrating a bi-directional video signal transmission system according to a sixth embodiment of this invention.

FIG. 8 is a block diagram showing an arrangement of a sixth embodiment of this invention. This embodiment is arranged such that a video coding and decoding system is provided for connection with external networks. In FIG. 8, a video coding and decoding unit (CODEC) 23 is provided to be coupled to a transceiver unit 5 so as to allow the input and output of an image signal therebetween, where an analog image signal is compressed and digital-coded and a digital signal is expanded and decoded. Data is transmitted from a workstation 24 coupled to a computer LAN 13 to a multiplexing unit (MUX) 25 so as to be multiplexed whereby it is possible to transfer the data together with an image signal. The output of this multiplexing unit 25, together with a control command from a network control unit (NCU) 26 which requests the connection to a network, is inputted to a terminal adapter (TA) 27 connected to an external network 28. When the user of an image input/output terminal 6 wants to make the bi-directional image communication with a other user connected to the external network 28, an external transmission request is made to a channel control workstation 11. Through the workstation 24, the channel control workstation 11 requests the network control unit 26 to make a call in the external network. In response to a call by the other user in the external network 28, the connection can be established, and the channel control workstation 11 then establishes the connection between the image input/output terminal 6 and the video coding and decoding unit 23. Thus, the connection between the bi-directional video signal transmission system and the external network can be realized. According to this embodiment, the hi-directional image communication can be realized between the video signal transmission system and an external television conference system coupled to a public network.

According to the present invention, by using video signal transmission lines based on the frequency multiplexing system in the bi-directional video signal transmission system, an image signal multiplexed in the first transmission line region is derived from the second transmission line region so that the transmission channels are assigned to the terminals under control of a computer. Thus, it is possible to connect about ten times as many terminals as the number of channels with eliminating the problem in security.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A bi-directional video signal transmission system comprising:
   transmission line means stretched to have upstream and downstream portions for transmitting a RF signal on which an analogue image signal is frequency-multiplexed;
   one-way amplifier means inserted into said transmission line means for amplifying said RF signal;
   modulating means for modulating a base-band image signal into a signal having a variable carrier frequency;
   mixing means inserted into the upstream portion of said transmission line means for mixing said signal modulated in said modulating means to said RF signal;
   dividing means inserted into the downstream porion of said transmission line means for picking up an image signal having a variable carrier frequency from said RF signal;
   demodulating means for demodulating said image signal picked up by said dividing means into said base-band image signal
   image signal input means for supplying said base-band image signal to said modulating means;
   image display means for outputting said base-band image signal from said demodulating means;
   transmission request means for generating a request of a video signal transmission;
   channel management means for receiving the request from said transmission request means and assigning an available transmission channel responsively thereto; and control means for controlling switching operations of modulation and demodulation in said modulating and demodulating means in accordance with the transmission channel assigned by the channel management means.

2. A bi-directional video signal transmission system as claimed in claim 1, wherein said modulating and demodulating means has a switching function for selecting one among a plurality of image signals to be inputted thereto.

3. A bi-directional video signal transmission system as claimed in claim 1, further comprising image signal recording and reproducing means coupled to said modulating and demodulating means.

4. A bi-directional video signal transmission system as claimed in claim 1, wherein said modulating and demodulating means is coupled to an external network through coding and decoding means for coding and decoding an image signal and further through an interface apparatus comprising a data-multiplexing unit.

5. A bi-directional video signal transmission system comprising:

transmission line means for transmitting an RF signal including a frequency-multiplexed video signal;

one-way amplifier means inserted into said transmission line means for amplifying said RF signal;

video signal input means for supplying a base-band video signal;

modulating means receiving said base-band video signal from said video signal input means for switchedly modulating said baseband video signal to one of a plurality of channels of said transmission line means by switchedly selecting one of a plurality of modulating frequencies and outputting a modulated video signal;

mixing means in an upstream portion of said transmission line means for mixing said modulated video signal with said RF signal;

separating means in a downstream portion of said transmission line means for separating the modulated video signal from said RF signal and outputting a separated video signal;

demodulating means for switchedly demodulating said separated video signal into said base-band video signal by switchedly applying one of a plurality of demodulating frequencies and outputting a demodulated video signal;

image display means for displaying said demodulated video signal;

transmission request means for generating a video signal transmission request;

channel management means for receiving the request from said transmission request means and assigning a variably selected transmission channel responsively thereto; and control means for controlling switching operations of said modulating and demodulating means in accordance with the transmission channel assigned by the channel management means.

6. A bi-directional video signal transmission system as claimed in claim 5, further comprising control signal transmission line means for transmitting said request from said transmission request means to said channel management means.

7. A bi-directional video signal transmission system as claimed in claim 6, wherein said control signal transmission line means is a computer LAN.

8. A bi-directional video signal transmission system comprising:

transmission line means stretched to have upstream and downstream portions for transmitting a RF signal on which an analogue image signal is frequency-multiplexed;

one-way amplifier means inserted into said transmission line means for amplifying said RF signal;

modulating means for modulating a base-band image signal into a signal having a variable carrier frequency;

mixing means inserted into the upstream portion of said transmission line means for mixing said signal modulated in said modulating means to said RF signal;

dividing means inserted into the downstream portion of said transmission line means for picking up an image signal having a variable carrier frequency from said RF signal;

demodulating means for demodulating said image signal picked up by said dividing means into said base-band image signal;

image signal input means for supplying said base-band image signal to said modulating means;

image display means for outputting said base-band image signal from said demodulating means;

transmission request means for generating a request of a video signal transmission;

channel management means for receiving the request from said transmission request means and assigning an available transmission channel responsively thereto;

control means for controlling switching operations of modulation and demodulation in said modulating and demodulating means in accordance with the transmission channel assigned by the channel management means; and control signal transmission line means for transmitting said request from said transmission request means to said channel management means.

9. A bi-directional video signal transmission system as claimed in claim 6, wherein said control signal transmission line means is a computer LAN.

* * * * *

UNITED STATES PATENT AND TRADEMARK OFFICE
CERTIFICATE OF CORRECTION

PATENT NO. : 5,365,264
DATED : November 15, 1994
INVENTOR(S) : Akino INOUE et al It is certified that error appears in the above-indentified patent and that said Letters Patent is hereby corrected as shown below:

IN THE DRAWINGS

Substitute the attached corrected formal drawings depicting Figs. 1, 3, 5, 6, 7 and 8 for Figs. 1, 3, 5, 6, 7 and 8 currently printed in the Deed of Letters Patent.

Signed and Sealed this

Eleventh Day of April, 1995

Attest:

BRUCE LEHMAN

Attesting Officer    Commissioner of Patents and Trademarks